United States Patent [19]
Biskis

[11] 3,734,293
[45] May 22, 1973

[54] THERMOELECTRIC ADSORBER

[75] Inventor: Edward B. Biskis, Borough of Emmaus, Pa.

[73] Assignee: Air Products and Chemicals, Inc., Allentown, Pa.

[22] Filed: Mar. 4, 1970

[21] Appl. No.: 15,319

Related U.S. Application Data

[63] Continuation of Ser. No. 740,791, May 16, 1968, abandoned, which is a continuation of Ser. No. 524,550, Feb. 2, 1966, abandoned.

[52] U.S. Cl. ............... 210/185, 210/269, 55/179, 55/208
[51] Int. Cl. .................................... B01d 53/04
[58] Field of Search .............. 55/179, 208; 62/3; 210/175, 185, 184, 269

[56] References Cited
UNITED STATES PATENTS

| | | |
|---|---|---|
| 2,083,732 | 6/1937 | Moore et al. .................. 55/179 X |
| 2,944,404 | 7/1960 | Fritts ................................. 62/3 |
| 2,974,747 | 3/1961 | Coolidge, Jr. et al. ........ 55/179 X |
| 3,073,126 | 1/1963 | Staebler .............................. 62/3 |
| 3,077,079 | 2/1963 | Pietsch .............................. 62/3 |
| 3,221,476 | 12/1965 | Meyer ............................ 55/179 X |
| 3,296,773 | 1/1967 | Hemstreet ..................... 55/208 X |

*Primary Examiner*—John Adee
*Attorney*—B. Max Klevit and Ronald B. Sherer

[57] ABSTRACT

A gas purification system of the adsorption type is disclosed wherein peltier type thermoelectric modules are employed with the adsorbent material so as to cool the adsorbent and eliminate unfavorable temperature gradients in the adsorber during the adsorption cycle, as well as heat the adsorbent during the regeneration cycle.

2 Claims, 4 Drawing Figures

Patented May 22, 1973 3,734,293

INVENTOR.
Edward G. Biskis
BY
Ronald B. Sherer
ATTORNEY

Patented May 22, 1973

INVENTOR.
*Edward G. Biskis*
BY
Ronald B. Sherer
ATTORNEY.

THERMOELECTRIC ADSORBER

CROSS REFERENCE TO RELATED APPLICATION

This application is a continuation of application Ser. No. 740,791, filed May 16, 1968, now abandoned, which application was a continuation of application Ser. No. 524,550, filed Feb. 2, 1966, now abandoned.

BACKGROUND OF THE INVENTION

The present invention relates to the purification of fluid streams and, more particularly, to a system for the removal of impurities from a gaseous or a liquid stream with an adsorber characterized by the provision of thermoelectric modules for obtaining optimum heating and cooling of the adsorbent during regeneration and adsorption cycles.

It is well known in the art that the adsorptivity of such adsorbents as silica gel, alumina, activated carbon, and molecular sieves is substantially increased by decreasing the temperature of the adsorbent. In conventional packed bed adsorbers, if the adsorbate is present in larger than trace concentrations, the energy released during adsorption causes a rise in bed temperature, and thereby lowers the bed's adsorptive capacity. Thus, it is common practice to provide cooling and heating systems of the fluid type for both cooling the adsorbent during the purification cycle as well as heating the adsorbent during the regeneration cycle. However, the provision of such fluid-type refrigeration and heating systems adds significantly to the weight and complexity of the adsorber unit and, most importantly, such temperature control systems have been relatively inefficient in that the inherently low thermal conductivity of packed bed adsorbers makes it difficult or impossible to attain the uniform removal of heat throughout the bed as it is generated during the purification cycle. In addition, the relatively high mass of adsorbent is such that precise temperature control in such systems is extremely difficult to obtain and there is a relatively long time delay in heating and cooling the adsorbent during each cycle of purification and regeneration.

SUMMARY OF THE INVENTION

In brief, the present invention solves the above-indicated problems of previously known adsorbers by incorporating thermoelectric modules into the adsorber; preferably, the adsorbent being in the form of relatively thin sheets or layers each of which is in effective heat exchange relationship with at least one thermoelectric module. In this manner, the refrigeration supplied by the thermoelectrics to the adsorbent during the adsorption cycle is such that the previously unfavorable internal temperature gradients are reversed and favorable gradients are established whereby substantially increased adsorption efficiency is achieved.

The complete invention, including all of the beneficial results thereof, will become more fully apparent from the following complete description when taken with the accompanying drawings, in which.

Figure 1:
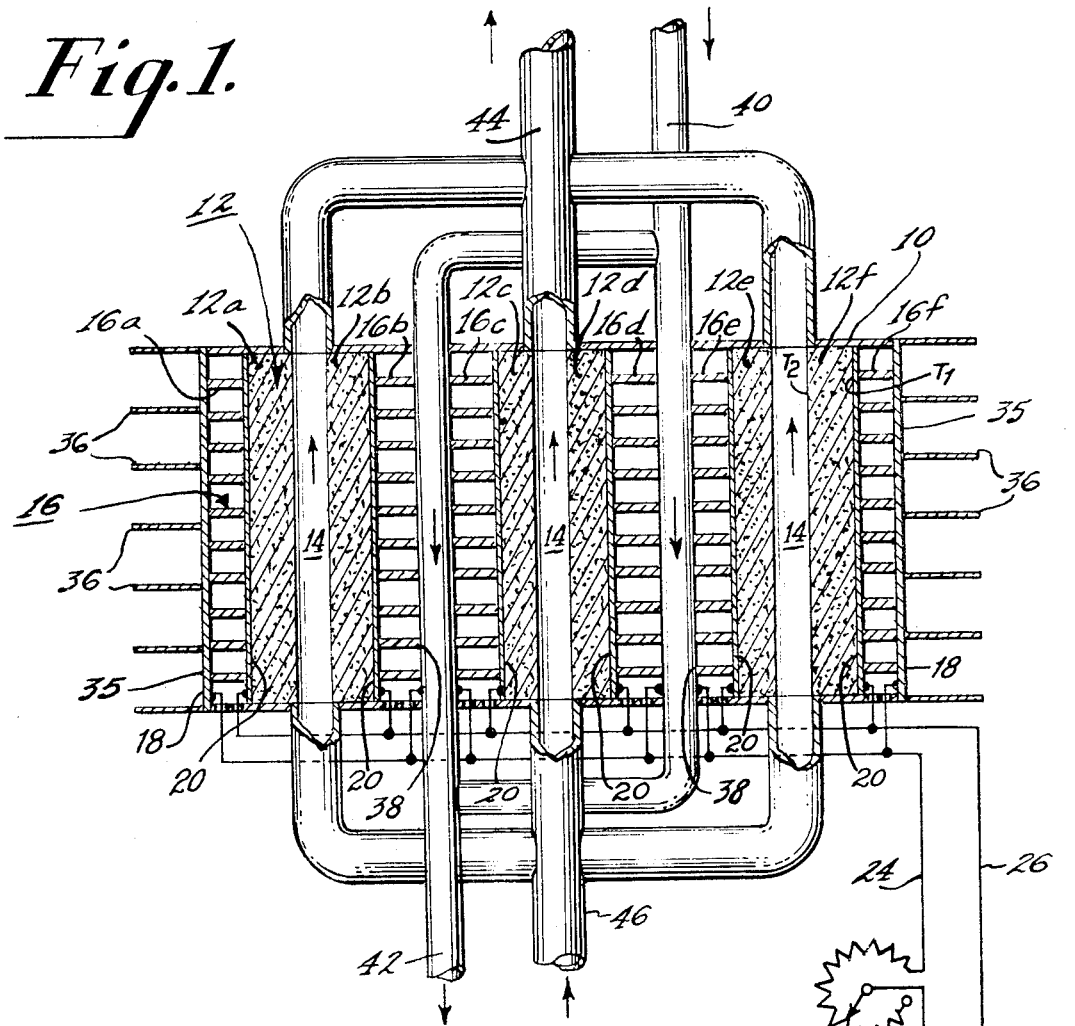
FIG. 1 is a schematic illustration of an adsorber constructed in accordance with the principles of the present invention.

Referring first to FIG. 1, numeral 10 indicates a casing which may be of any suitable material. Within casing 10 there is provided a plurality of layers 12 of adsorbent material such as, for example, silica gel, activated charcoal, alumina, molecular sieve, or other known adsorbents used singularly or in combination. The use of several adsorbents in the same enclosure permits the simultaneous or at least the progressive removal of several contaminants. In the illustrated embodiment, the adsorbent is shown as comprising a solid layer which may be formed by suitably compacting the adsorbent; however, it will be equally apparent that the adsorbent may be in a loose form such that the fluid stream to be purified flows directly through and around the particles of adsorbent rather than through a defined passageway such as passages 14. These passages are connected to associated conduits 44 and 46.

As further shown in the drawing, each of the individual layers of adsorbent 12a through 12f is directly adjacent to one side of a Peltier thermoelectric module, such modules being generally indicated by numeral 16. Each of the individual thermoelectric modules 16a through 16f may be of conventional design which is well known in the thermoelectric art. For example, each module may comprise a pair of face plates 18 and 20 between which there are located one or more, and preferably a series, of thermoelectric elements forming Peltier heat adsorbing and heat generating junctions, the junctions being arranged such that one face plate is heated and the other is cooled when current is applied in a first direction. Since such thermoelectric modules are well known, commercially available, and are described, for example, in the Sept. 16, 1963 issue of *Product Engineering*, further description of the constructional details thereof are believed to be unnecessary.

Plates 18 and 20 are electrically connected by leads 24 and 26 to a reversing switch 28, the contact of which is connected to a suitable power source 30. In order to vary the current supplied to the thermoelectric elements and thereby control their temperature, a conventional rheostat 32 is connected in lead 24 and it will be apparent that the operation of reversing switch 28 enables the plates 18 and 20 to be selectively heated and cooled by reversing the polarity of the applied voltage.

In the illustrated embodiment, the outermost thermoelectric elements 16a and 16f are provided on their outer plates 18 with heat radiators or rejectors which comprise a plurality of fins 36 composed of material having high thermal conductivity such that the heat is dissipated from the fins 36 to the surrounding atmosphere. At the same time, the inner thermoelectric modules 16b, 16c, 16d, and 16e are arranged in back-to-back fashion such that their internal thermoelectric elements 16 forming the Peltier junctions may be directly connected to pipes or conduits 40 and 42. That is, the pipes forming passages 38 may serve the function of plates 18 or, obviously, additional plates corresponding to plates 18 may be used with such additional plates being in direct thermal contact with the pipes 40, 42.

From the foregoing description of the apparatus it will be seen that the fluid to be purified is admitted to the adsorber through conduit 46 and that this fluid is purified by adsorbent material 12 as it passes through internal passages 14, after which it is conveyed to the point of use through conduit 44. By way of example, conduit 44 may be connected to an inhalator supplying oxygen to an aircraft pilot or a patient in a hospital. At the same time, a second fluid is passed through conduit 40 and passages 38 and exhausted through conduit 42 so that the exothermic heat of adsorption is continuously removed from the adsorbers. During the purification cycle, plates 20 in contact with each of the adsorbent layers are maintained at a predetermined low temperature for maximum efficiency of the adsorbent and, conversely, plates 18 are at predetermined elevated temperatures as determined by the amount of fluid flowing through passages 38 and the temperature of the environment to which heat is rejected by fins 36. On regeneration, switch 28 is reversed so that the polarity of each thermoelectric module 16 is reversed. Thus, plates 20 become heating elements which quickly raise the temperature of the adsorbent material and thereby drive out previously adsorbed impurities. Suitable means, such as a purge fluid or a vacuum, may be employed to remove the desorbed impurities. By providing switching valves (not shown) a plurality of adsorber units may be continuously operated with alternating purification and regeneration cycles.

Figure 2:
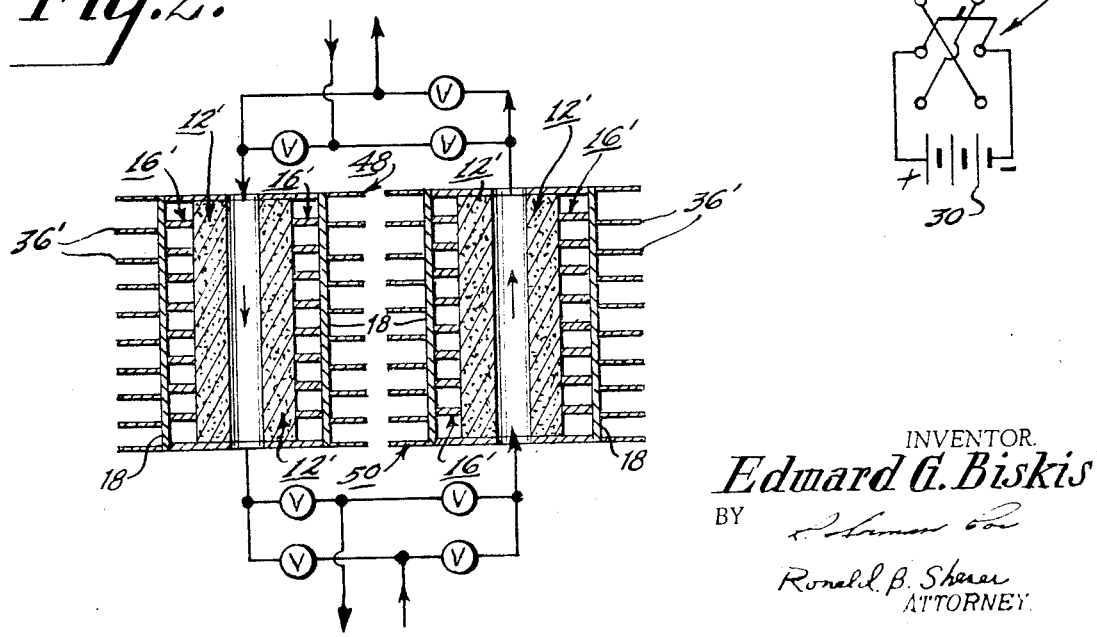
FIG. 2 is a schematic illustration of a modified form of adsorber constructed in accordance with the principles of the present invention.

While the foregoing description of the FIG. 1 embodiment has included the provision of fluid conduits 40, 38, and 42, it should be apparent that the provision of the thermoelectric modules provides a means whereby cumbersome fluid circuits may be entirely eliminated. This is shown in FIG. 2 wherein additional heat radiators 48 and 50 are employed in place of fluid circuits. Thus, the adsorbent layers 12' are both heated and cooled by the thermoelectric modules 16' without the need for any fluid circuit, it being understood that the thermoelectric modules are connected to a power source through a reversing switch as in the FIG. 1 embodiment. As shown in FIG. 2, plates 18 carry radiators 36', as in the FIG. 1 embodiment, and it will be noted that the thermoelectric junctions 16' are shown as being in direct contact with the adsorbent. Alternatively, a plate 20 may be interposed therebetween as previously illustrated and described with reference to the FIG. 1 embodiment.

Figure 4:
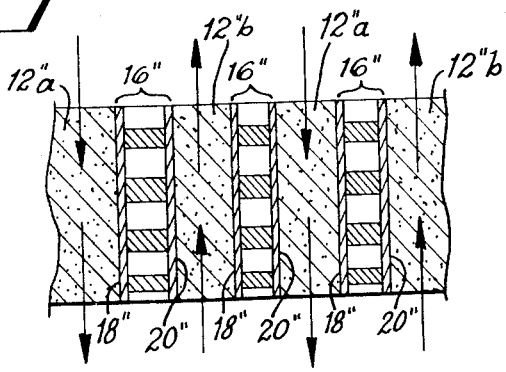
FIG. 4 is a schematic illustration of a modified embodiment of the invention.

In another modification of the invention schematically shown in FIG. 4, both sides of each thermoelectric module 16" are contacted with adsorbent materials 12"a and 12"b. In this embodiment, adsorbent on one side of the thermoelectric module 16" is on the adsorption cycle while the adsorbent on the other side is being regenerated. Thus, the exothermic heat of adsorption is thermoelectrically transferred from one side to the other and used for endothermic desorption. Periodically, the roles of the adsorption and desorption sides are reversed.

When the adsorbent is in the form of "sheets" these sheets do not have to be flat. For example, they may be in the form of cylindrical annuli coating cylindrical thermoelectric elements which have internal fluid passages. In another contemplated variation, the surface of the sheets has a sawtooth arrangement. It should thus be apparent that the walls containing adsorbent may even engage with each other by partial overlapping or interpenetration of alternate projections and recesses.

It will therefore be apparent that the present invention results in improved temperature control and efficiency of the adsorbers by the incorporation of relatively miniaturized heating and cooling devices such that both the size and weight of the purification system may be substantially reduced. In essence, the thermoelectric elements which provide refrigeration for the exothermic adsorption cycle and thermal energy for the endothermic desorption cycle result in beneficial temperature gradients inside the adsorbent promoting mass transfer during both phases of the cycle.

When plates of solid adsorbent are bonded directly to the thermoelectric element, contaminant mass transfer within the adsorbent is particularly enchanced. The temperature effect of the thermoelectric element on the adsorbent is direct and only indirect on the fluid which is passed through the adsorber. Thus, precise temperature control can be obtained in the adsorber without significantly affecting the temperature of the treated fluid and the capacity of the adsorbent depends on its temperature rather than on the bulk temperature of the fluid. Moreover, since heat is being transferred from the fluid stream-adsorbent interface ($T_2$) to the adsorbent-thermoelectric element interface ($T_1$), the temperature of $T_1$ is lower than that of $T_2$. Thus, the capacity on the inside of the adsorbent is higher than the capacity at the fluid stream-adsorbent interface thereby driving contaminated molecules toward the thermoelectric element. To regenerate, the electric current flow is reversed, thereby making $T_2$ greater than $T_1$ and the contaminant is forced out of the adsorbent.

The opposite is true, however, in conventional packed bed adsorption. Since exothermic adsorption is taking place within each particle and since the fluid stream provides the only refrigeration in the system, the outside of each pellet particle is cooler than the inside. Thus, a mass transfer restriction instead of enhancement is obtained. This mass transfer restriction is not overcome by external temperature control means.

Among other uses, the thermoelectric adsorber of this invention can be used to control the level of carbon dioxide and water vapor as well as other inorganic and organic contaminants in closed ecological systems. As applied to manned space vehicles and aviator rebreather systems, the thermoelectric adsorber is regenerative in operation, requires no addition of chemicals or reagents, needs a minimum of maintenance and is unaffected by extreme vibrations and forces.

Other examples of the use of the disclosed purification system include the removal of impurities from carbon dioxide for carbonation of beverages or the production of dry ice and the purification of hydrogen for use in the hydrogenation of vegetable oils or for chemical reduction processes. Even contaminants such as the freon family which are not successfully reacted in catalytic oxidation systems can be controlled with a modified thermoelectric adsorber.

The invention is further clarified by reference to the following examples.

EXAMPLE I

To compare the degree of mass transfer and adsorbent capacity enhancement achieved by imposing a temperature gradient on an adsorbent, a comparative analysis was made of adiabatic, isothermal, and thermoelectric-internal-temperature gradient adsorption. In this analysis the concentration of the oxygen contaminant, carbon dioxide, was to be reduced from one to essentially zero mol percent using 13× Molecular Sieve adsorbent (having a composition expressed in ratio terms of mol oxides of 0.9±0.2 $Na_2O:Al_2O_3:WSiO_2:xH_2O$ where $w$ has a value of less than about 3 and $x$ has a value of up to about 8) in sheet form.

In the following table, Case A is the adiabatic adsorption situation normally encountered in oxygen purification where the gas enters the adsorber at 70°F and the exothermic adsorption of carbon dioxide raises the temperature of the gas an adsorbent bed to 100°F.

Case B represents the standard isothermal adsorption in which oxygen enters the adsorber at 70°F and enough external cooling is provided to remove the heat of adsorption sufficiently to keep both the oxygen and adsorbent at 70°F.

In Case C thermoelectric refrigeration is employed to remove the heat of adsorption and maintain a 70°F temperature differential across the thickness of the adsorbent sheet.

| Case | Mass Transfer Rate Relative to Adiabatic Case A | Adsorbent Capacity Relative to Case A | Adsorber Size Relative to Case A |
|---|---|---|---|
| A. Adiabatic | 1.00 | 1.00 | 1.00 |
| B. Isothermal | 1.06 | 1.59 | 0.63 |
| C. Internal Temperature Gradient; i.e., with Thermoelectrics | 1.20 | 2.18 | 0.31 |

Thus, not only is Case C superior to Cases A and B but the thermoelectric elements in Case C can be regenerated simply by reversing the polarity of the thermoelectric elements. Elaborate regeneration gear is required for both the adiabatic and isothermal adsorbent.

EXAMPLE II

A thermoelectric adsorber having two flow channels was employed to study the adsorption of carbon dioxide from a nitrogen Stream containing two per cent carbon dioxide. Each of the flow channels has an adsorbent disc (1⅛ inches in diameter and ⅛ inches thick) bonded on one side to an Encon Model G–65 thermoelectric element. Fabrication of the discs consisted of (1) mixing 80 parts by weight of Molecular Sieve 13X powder, 20 parts of kaolin clay and 40 parts of water; (2) pressing this mixture into discs; and (3) baking the discs at 650°C in an atmosphere of nitrogen. Gas flow was parallel to the exposed side of each disc.

Figure 3:
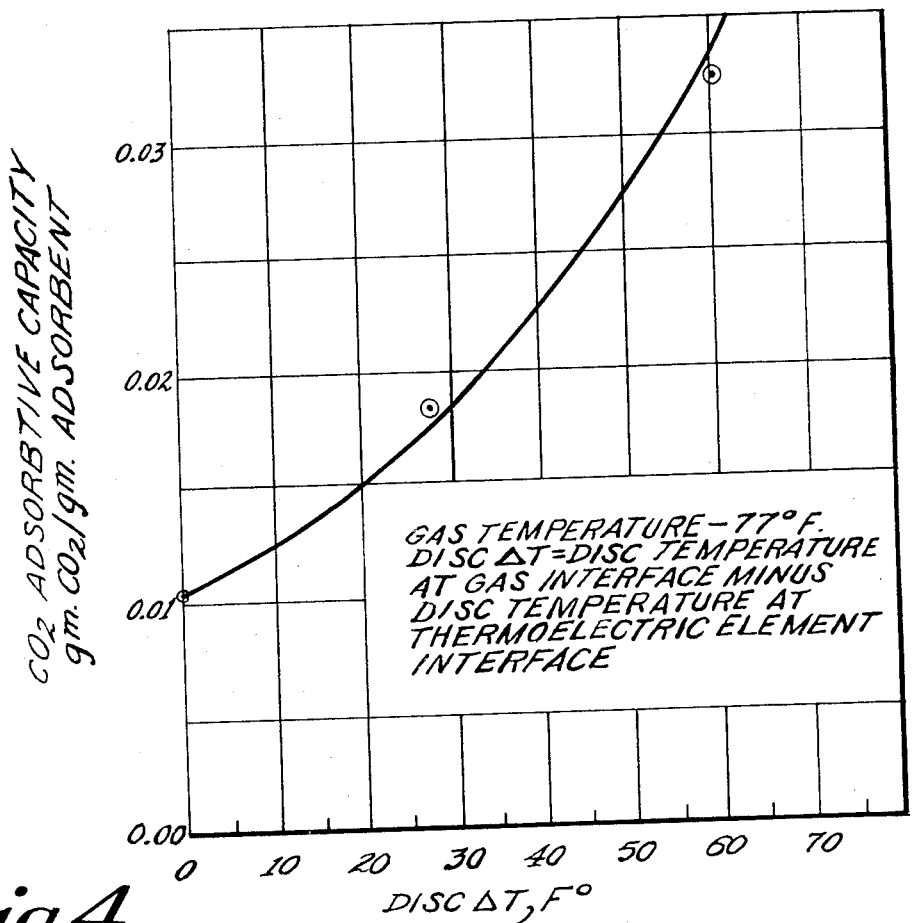
FIG. 3 is a graph showing the effect of favorable temperature gradients on adsorption.

The adsorber was operated with and without thermoelectric refrigeration to determine the effect of an internal temperature gradient on the $CO_2$ capacity of the adsorbent. In these comparison runs, all variables, with the exception of the temperature differential through the thickness of the disc, were held constant. FIG. 3, a graph of adsorptive capacity versus disc temperature differential, is representative of the results obtained. It can be seen that an internal temperature gradient does indeed improve the $CO_2$ capacity of the adsorbent.

In a supplemental test, the adsorber was operated without refrigeration until the discs were saturated. Without altering any other variables, refrigeration was applied and within seconds a 29°F differential across the discs was obtained. The $CO_2$ concentration of the effluent (as analyzed by an IR $CO_2$ analyzer) decreased immediately and the capacity of the adsorbent discs increased 61 per cent.

By reversing the flow of electric current to the thermoelectric elements it was determined that the regeneration of the thermoelectric adsorber was faster, more complete and easier to control than an equivalent regeneration of packed beds.

It is thus apparent that the purification system of the present invention has the advantages of compactness, simplicity, reliability, and flexibility.

The energy requirements for both adsorption and desorption are provided by the same thermoelectric elements, thereby minimizing the weight and size of the energizing subsystem. The combination of refrigerated adsorption and heat desorption also minimizes the adsorbent mass which is required.

Simplicity is obtained by a directional change of electric current flow which converts the energizing elements from coolers during adsorption to heaters during regeneration.

Other than solenoid switch valves and an air blower, which are needed in all fluid purification processes, the thermoelectric adsorber contains no moving parts.

The degree of contaminant clean-up can be altered by changing the temperature of the thermoelectric elements. In other words, within design limits, the contaminant capacity of such a system can be instantaneously increased by increasing the current flow.

Obviously, many modifications and variations of the invention as hereinbefore set forth may be made without departing from the spirit and scope thereof, and therefore only such limitations should be imposed as are indicated in the appended claims.

What is claimed is:

1. A purification system for removing impurities from a fluid stream comprising, in combination, first and second individual layers of adsorbent material, means for passing fluid streams in contact with said first and second individual layers of adsorbent material, at least one Peltier type thermoelectric element having a heat producing portion in heat exchange with said first layer of adsorbent material and a refrigeration producing portion in heat exchange relation with said second layer of adsorbent material, and electrical means for supplying current to said thermoelectric element for simultaneously heating and cooling said respective first and second layers of adsorbent material.

2. The purification system as claimed in claim 1 wherein said electrical means include reversing switch means for alternately heating and cooling each of said first and second layers of an adsorbent material.

* * * * *